United States Patent
Lee

(10) Patent No.: US 8,417,984 B2
(45) Date of Patent: *Apr. 9, 2013

(54) DYNAMICALLY SCALING APPARATUS FOR A SYSTEM ON CHIP POWER VOLTAGE

(75) Inventor: Jong Pil Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,484

(22) Filed: Sep. 22, 2011

(65) Prior Publication Data

US 2012/0007577 A1    Jan. 12, 2012

Related U.S. Application Data

(63) Continuation of application No. 12/034,051, filed on Feb. 20, 2008, now Pat. No. 8,046,622.

(30) Foreign Application Priority Data

Feb. 27, 2007   (KR) ................. 10-2007-0019710

(51) Int. Cl.
*G06F 1/00* (2006.01)
(52) U.S. Cl. ......... 713/500; 713/300; 713/322; 716/138
(58) Field of Classification Search .................. 713/300, 713/322, 500; 716/138
See application file for complete search history.

(56) References Cited

U.S. PATENT DOCUMENTS

| | | | |
|---|---|---|---|
| 5,295,112 A | 3/1994 | Taniguchi | |
| 6,198,261 B1 | 3/2001 | Schultz et al. | |
| 6,636,976 B1 | 10/2003 | Grochowski et al. | |
| 6,789,207 B1 | 9/2004 | Maejima | |
| 6,826,705 B2 * | 11/2004 | Tani | 713/320 |
| 6,895,520 B1 | 5/2005 | Altmejd et al. | |
| 7,032,117 B2 | 4/2006 | Kolinummi et al. | |
| 7,236,920 B2 | 6/2007 | Grochowski et al. | |
| 7,472,294 B2 | 12/2008 | He et al. | |
| 7,568,117 B1 | 7/2009 | Fernald | |
| 7,640,446 B1 | 12/2009 | Donovan | |
| 7,793,125 B2 * | 9/2010 | Berry et al. | 713/320 |

(Continued)

FOREIGN PATENT DOCUMENTS

| | | |
|---|---|---|
| JP | 2005073231 | 3/2005 |
| KR | 100103168 | 3/1996 |
| KR | 1020050082761 A | 8/2005 |
| KR | 1020060102659 A | 9/2006 |

*Primary Examiner* — Kim Huynh
*Assistant Examiner* — Zahid Choudhury
(74) *Attorney, Agent, or Firm* — Volentine & Whitt, PLLC

(57) ABSTRACT

A system for dynamically scaling a power voltage including a system on chip (SoC) and a power control circuit. The SoC includes a plurality of application circuits. The SoC is configured to generate internal clock signals in response to an externally supplied clock signal. The SoC also generates a target voltage that changes based on a change of an operating current. The internal clock signals are respectively provided to the application circuits. The operating current is a sum or total current of the application circuits. The power control circuit generates an internal power voltage based on the target voltage and provides the internal power voltage to the SoC. The system for dynamically scaling a power voltage including a SoC may decrease power consumed in the SoC because the system of dynamically scaling a power voltage decreases a required voltage margin by changing a target voltage before a transition of the SoC current.

11 Claims, 9 Drawing Sheets

U.S. PATENT DOCUMENTS

| | | |
|---|---|---|
| 2002/0144164 A1 | 10/2002 | Chen |
| 2004/0057390 A1 | 3/2004 | Boleyn et al. |
| 2004/0093532 A1 | 5/2004 | Hotta et al. |
| 2004/0123170 A1* | 6/2004 | Tschanz et al. ............... 713/320 |
| 2004/0236975 A1 | 11/2004 | Gaskins et al. |
| 2006/0047988 A1 | 3/2006 | Okada |
| 2006/0123256 A1 | 6/2006 | Cornelius |
| 2006/0184812 A1 | 8/2006 | Nguyen et al. |
| 2007/0076455 A1 | 4/2007 | Burstein |
| 2007/0266262 A1 | 11/2007 | Burton et al. |
| 2010/0225287 A1 | 9/2010 | Schultz |

* cited by examiner

DYNAMICALLY SCALING APPARATUS FOR A SYSTEM ON CHIP POWER VOLTAGE

CROSS-REFERENCE TO RELATED APPLICATIONS

This application is a continuation application of application Ser. No. 12/034,051 filed on Feb. 20, 2008, which claims priority under 35 USC §119 to Korean Patent Application No. 10-2007-0019710 filed on Feb. 27, 2007 in the Korean Intellectual Property Office, the disclosure of which is incorporated herein in its entirety by reference.

BACKGROUND OF THE INVENTION

1. Field of the Invention

The present invention relates generally to system on chip devices. More particularly, embodiments of the invention relate to a system and method of dynamically scaling a power voltage associated with system on chip devices used in mobile electronics.

2. Discussion of Related Art

System on chip (SoC) technology is widely used in mobile electronic devices to provide fast operational speeds with relatively small power consumption. Dynamic power consumption of a complementary metal oxide semiconductor (CMOS) integrated circuit may be represented by Equation 1:

$$Pd = CL \times VDD^2 \times fp, \quad \text{[Equation 1]}$$

where Pd indicates power consumption, CL indicates a capacitance of the integrated circuit, VDD indicates a power supply voltage (hereinafter, it is referred to as a power voltage) provided to the integrated circuit and fp indicates an operational frequency of the integrated circuit. Power consumption is provided in proportion to the capacitance (CL), square of the power voltage (VDD) and the operation frequency (fp). Generally, as the operation frequency (fp) decreases, the power consumption Pd may be decreased. However, semiconductor integrated circuits need to be operated at a high operation frequency (fp) which would increase power consumption Pd.

FIG. 1 is a graph illustrating the relation between power voltage and a maximum operation frequency of a conventional SoC. As the power voltage increases, the maximum operation frequency also increases. FIG. 2 is a graph illustrating the relation between a throughput and a power voltage of a conventional SoC. FIG. 2 illustrates that the power voltage increases when the throughput is large and the power voltage decreases when the throughput is small.

FIG. 3 is a graph illustrating a waveform of a power voltage of a conventional SoC when a target voltage is transmitted. Output voltage VDD of a converter swings between a lower limit voltage and a higher limit voltage in response to target voltage VTARG. Power voltage VDD includes an overshoot voltage VOVSH when target voltage VTARG transitions from a low to a high logic voltage, and power voltage VDD includes an undershoot voltage VUNSH when target voltage VTARG transitions from a high to a low logic voltage. Power voltage VDD drives the SoC and is controlled within a predetermined range. The higher limit voltage is determined based on a hold violation that occurs when the operation speed of the transistors in the SoC is fast. The lower limit voltage is determined based on a setup violation that occurs when the operation speed of the transistors in the SoC is slow. Overshoot voltage VOVSH and undershoot voltage VUNSH are controlled between the higher limit voltage and the lower limit voltage. The overshoot voltage VOVSH and the undershoot voltage VUNSH are increased in proportion to the variation of the target voltage VTARG. Therefore, the overshoot voltage VOVSH and the undershoot voltage VUNSH are decreased by changing the target voltage VTARG step by step.

A clock signal is applied to the SoC based on a gated clock scheme in order to decrease power consumption consumed in several application circuits within the SoC. The gated clock scheme applies clock signals to the application circuit blocks to be activated, and disables clock signals applied to application circuit blocks which are deactivated. The power consumption of the SoC is rapidly increased or rapidly decreased when the clock signals applied to the application circuit blocks are enabled or disabled. A rapid change in the power consumption of the SoC causes a change in the overshoot voltage VOVSH and the undershoot voltage VUNSH of power voltage VDD.

FIG. 4 is a graph illustrating waveforms associated with a power voltage according to changes of a load current and a target voltage in a conventional SoC. The undershoot voltage VUNSH of power voltage VDD results at time T3 when the load current ILOAD transitions from about 10 mA to about 50 mA. The overshoot voltage VOVSH of power voltage VDD results at time T4 when load current ILOAD transitions from about 50 mA to about 10 mA. The load current ILOAD denotes a current of the application circuits in the SoC. In a conventional SoC, the target voltage VTARG and the power voltage VDD are fixed as illustrated in FIG. 4. Thus, target voltage VTARG requires a sufficient voltage margin so as to force power voltage VDD to be greater than the lower limit voltage even though the undershoot voltage VUNSH is generated. The target voltage VTARG is a fixed value, for example, about 1.25V forcing unnecessary power consumption in a conventional SoC. Accordingly, there is a need to suppress the overshoot voltage VOVSH and the undershoot voltage VUNSH when load current ILOAD is changed due to a clock signal transition.

SUMMARY OF THE INVENTION

Exemplary embodiments of the present invention are directed to a system on chip device. In an exemplary embodiment, the system on chip (SoC) includes a plurality of application circuits, a micro controller unit and an internal clock generation unit. The micro controller unit communicates with the plurality of application circuits and is configured to generate clock enable signals respectively used for the application circuits. The micro controller is further configured to estimate a change of an operating current and generate a target voltage based on the change of the operating current where the operating current is a total current of the application circuits. The internal clock generation unit communicates with the plurality of application circuits and is configured to generate internal clock signals in response to an external clock signal and the clock enable signals from the micro controller unit. The internal clock signals being respectively provided to the application circuits.

DESCRIPTION OF EMBODIMENTS

Figure 1:
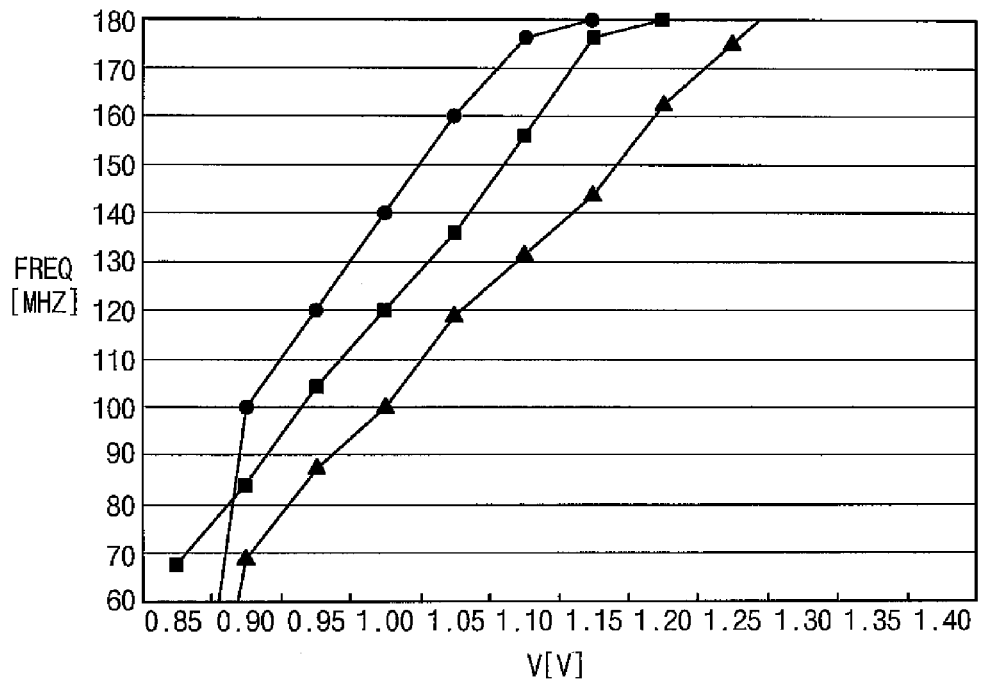
FIG. 1 is a graph illustrating a relation between a power voltage and a maximum operation frequency of a conventional SoC.
Figure 2:
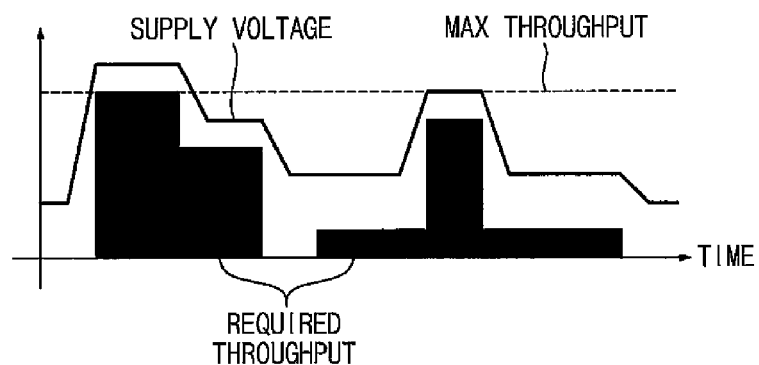
FIG. 2 is a graph illustrating a relation between a throughput and a power voltage of a conventional SoC.
Figure 3:
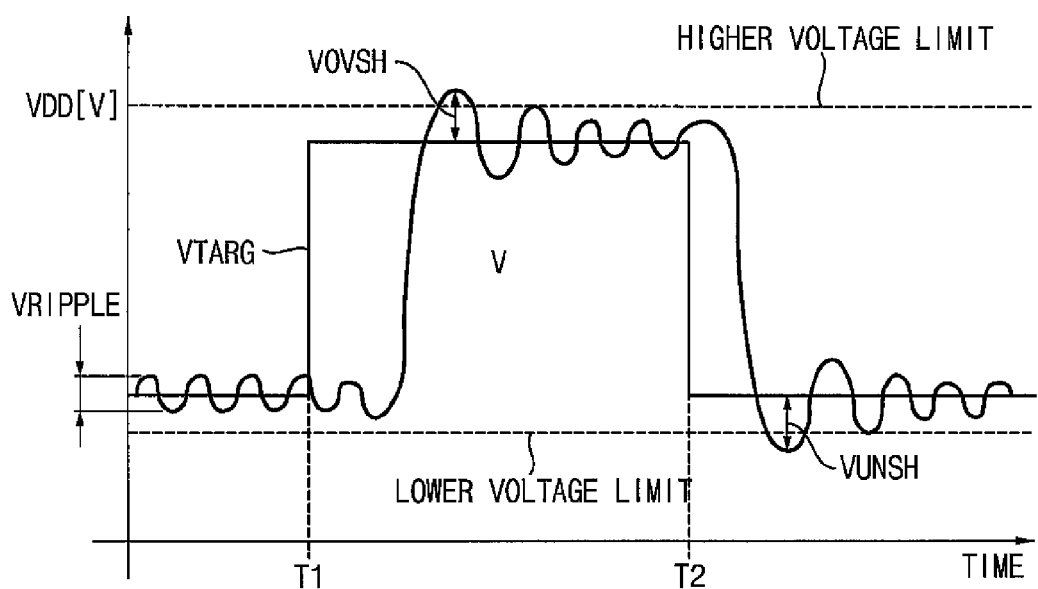
FIG. 3 is a graph illustrating a waveform of a power voltage of a conventional SoC when a target voltage transits.
Figure 4:
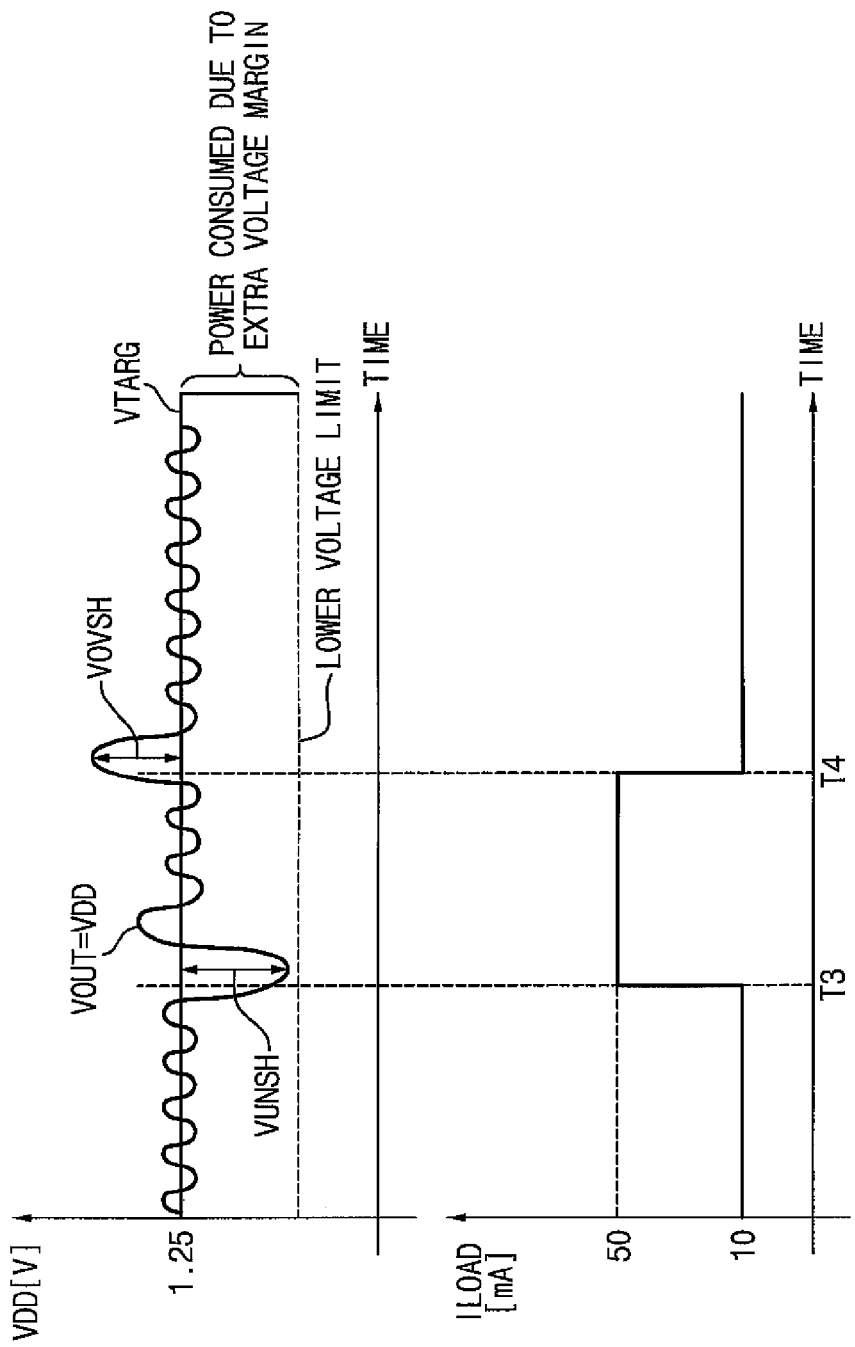
FIG. 4 is a graph illustrating waveforms of a power voltage according to changes of a load current and a target voltage in a conventional SoC.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 5:
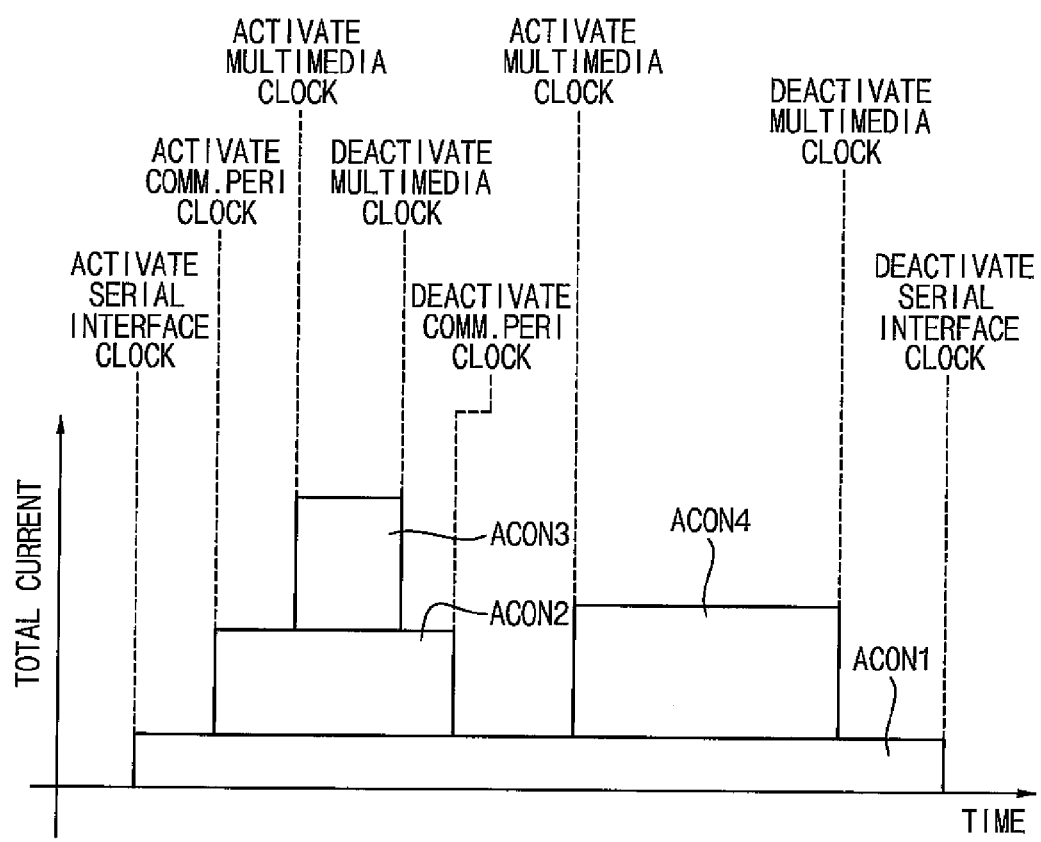
FIG. 5 is a graph illustrating a relation between transitions of clock signals provided to blocks in a system on chip (SoC) and an operating current of the SoC.

FIG. 5 is a graph illustrating the relation between clock signal transitions provided to blocks in a system on chip (SoC) and an operating current of the SoC. The SoC includes a serial interface circuit, a communication circuit and a multimedia circuit. The serial interface circuit is activated in a first region ACON1, the communication circuit is activated in a second region ACON2, and the multimedia circuit is activated in a third ACON3 and fourth regions ACON4. The region where application circuits in the SoC are simultaneously activated is limited, and the operating current of the SoC is changed according to a number of the activated application circuits.

Figure 6:
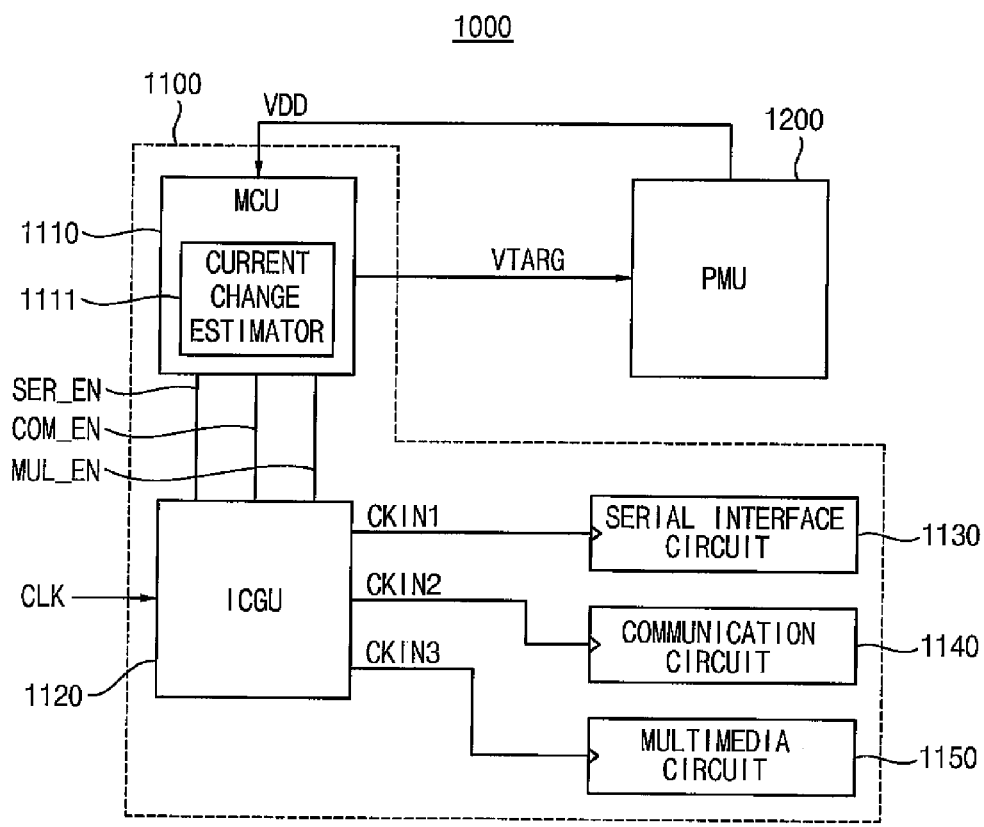
FIG. 6 is a block diagram illustrating a system of dynamically scaling a power voltage according to an example embodiment of the present invention.

FIG. 6 is a block diagram illustrating a system 1000 of dynamically scaling a power voltage including SoC 1100 and power control circuit (PMU; power management unit) 1200. SoC 1100 may include application circuits 1130, 1140 and 1150. The SoC 1100 generates internal clock signals CKIN1, CKIN2 and CKIN3 in response to an external clock signal CLK. SoC 1100 estimates a change of a first current and generates target voltage VTARG which changes based on the change of the first current. The first current is an operating current that is a total current from application circuits 1130, 1140 and 1150. Internal clock signals CKIN1, CKIN2 and CKIN3 are respectively provided to each of the application circuits 1130, 1140 and 1150. The application circuits may be, for example, a serial interface circuit 1130, a communication circuit 1140 and a multimedia circuit 1150 however; arbitrary application circuits may also be employed.

Power control circuit 1200 generates power voltage VDD based on target voltage VTARG and provides power voltage VDD to SoC 1100. SoC 1100 includes micro controller unit 1110, internal clock generation unit 1120, serial interface circuit 1130, communication circuit 1140 and multimedia circuit 1150. Micro controller unit 1110 generates clock enable signal SER_EN used for serial interface circuit 1130, clock enable signal COM_EN used for communication circuit 1140 and clock enable signal MUL_EN used for multimedia circuit 1150. Micro controller unit 1110 includes a current change estimation unit 1111 configured to estimate the change of the first current and generates target voltage VTARG. The first current is the total current of the serial interface circuit 1130, the communication circuit 1140 and the multimedia circuit 1150. The target voltage VTARG is changed based on the change of the first current signal. Internal clock generation unit 1120 generates the internal clock signals CKIN1, CKIN2 and CKIN3 in response to the external clock signal CLK and the clock enable signals SER_EN, COM_EN and MUL_EN.

Figure 7:
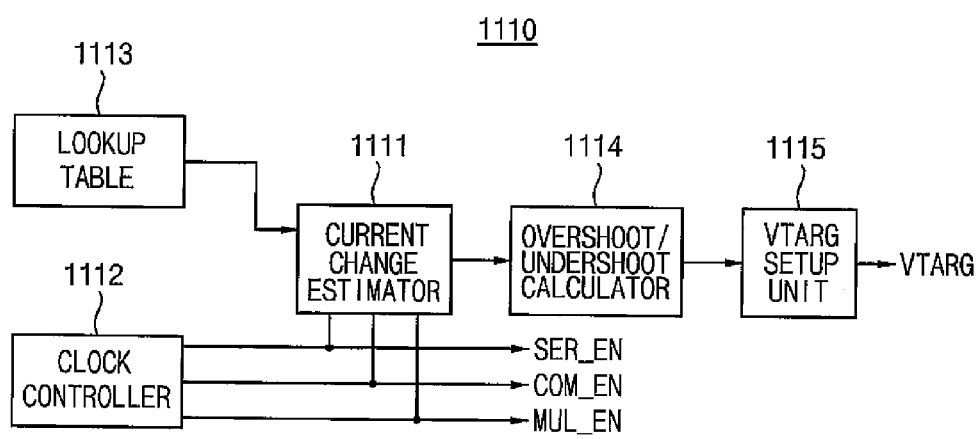
FIG. 7 is a block diagram illustrating a micro controller unit in the SoC of FIG. 6.

FIG. 7 is a block diagram illustrating a micro controller unit 1110 in the SoC of FIG. 6 which includes lookup table 1113, clock control unit 1112, current change estimation unit 1111, overshoot/undershoot calculation unit 1114 and target voltage setup unit 1115. The lookup table stores current measurements consumed in each of the application circuits including the serial interface circuit 1130, the communication circuit 1140 and the multimedia circuit 1150. Clock control unit 1112 generates clock enable signals SER_EN, COM_EN and MUL_EN. Current change estimation unit 1111 estimates the change of the first current in response to the magnitude of the currents consumed in each of the application circuits and the clock enable signals SER_EN, COM_EN and MUL_EN. The overshoot/undershoot calculation unit 1114 calculates an overshoot voltage and an undershoot voltage of power voltage VDD corresponding to the change of the first current. The target voltage setup unit 1115 generates target voltage VTARG which changes based on the overshoot voltage and the undershoot voltage.

In operation, micro controller unit 1110 generates clock enable signals SER_EN, COM_EN and MUL_EN respectively used for the serial interface circuit 1130, the communication circuit 1140 and the multimedia circuit 1150. First clock enable signal SER_EN enables first internal clock signal CKIN1 provided to serial interface circuit 1130. Second clock enable signal COM_EN enables second internal clock signal CKIN2 provided to communication circuit 1140. Third clock enable signal MUL_EN enables third internal clock signal CKIN3 provided to multimedia interface circuit 1150. Lookup table 1113 stores the magnitude of the currents consumed when serial interface circuit 1130, communication circuit 1140 and multimedia circuit 1150 operate normally. Current change estimation unit 1111 detects activated application circuits of the serial interface circuit 1130, communication circuit 1140 and multimedia circuit 1150 using logic states of the clock enable signals SER_EN, COM_EN and MUL_EN. Current change estimation unit 1111 estimates the magnitudes of the currents consumed in each of the activated application circuits.

Overshoot/undershoot calculation unit 1114 calculates the overshoot voltage and the undershoot voltage of power voltage VDD corresponding to the change of the first current. The overshoot voltage and the undershoot voltage are proportional to the total currents of application circuits 1130, 1140 and 1150. That is, overshoot voltage and undershoot voltage are proportional to a load current. The relationship between the overshoot voltage and the load current and the relationship between the undershoot voltage and the load current are described with reference to power control circuit 1200. Target voltage setup unit 1115 generates target voltage VTARG that is changed based on the overshoot voltage and the undershoot voltage. That is, target voltage VTARG increases when the overshoot voltage or the undershoot voltage is increased, and target voltage VTARG decreases when the overshoot voltage or the undershoot voltage decreases.

Figure 8:
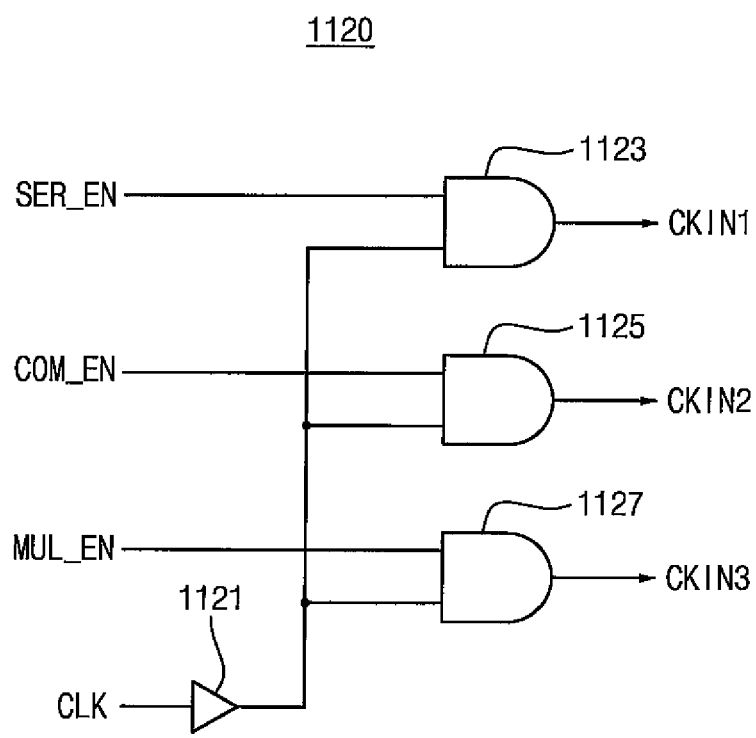
FIG. 8 is a circuit diagram illustrating an internal clock generation unit in the SoC of FIG. 6.

FIG. 8 is a circuit diagram illustrating an internal clock generation unit 1120 that includes buffer 1121, first clock gating circuit 1123, second clock gating circuit 1125 and third clock gating circuit 1127. Each of the clock gating circuits 1123, 1124 and 1125 may be an AND gate. Buffer 1121 buffers external clock signal CLK. The first clock gating circuit 1123 performs a gating function for the output signal from buffer 1121 in response to first clock enable signal SER_EN to generate first internal clock signal CKIN1. First internal clock signal CKIN1 is supplied to serial interface circuit 1130. Second clock gating circuit 1125 performs a gating function for the output signal of buffer 1121 in response to second clock enable signal COM_EN to generate second internal clock signal CKIN2. Second internal clock signal CKIN2 is supplied to communication circuit 1140. Third clock gating circuit 1127 performs the gating function of the output signal from buffer 1121 in response to the third clock enable signal MUL_EN to generate the third internal clock signal CKIN3. Third internal clock signal CKIN3 is supplied to multimedia circuit 1150. The first internal clock signal CKIN1 is enabled in response to first clock enable signal SER_EN and is supplied to serial interface circuit 1130. Second internal clock signal CKIN2 is enabled in response to the second clock enable signal COM_EN and is supplied to communication circuit 1140. Third internal clock signal CKIN3 is enabled in response to the third clock enable signal MUL_EN and is supplied to multimedia circuit 1150.

Figure 9:
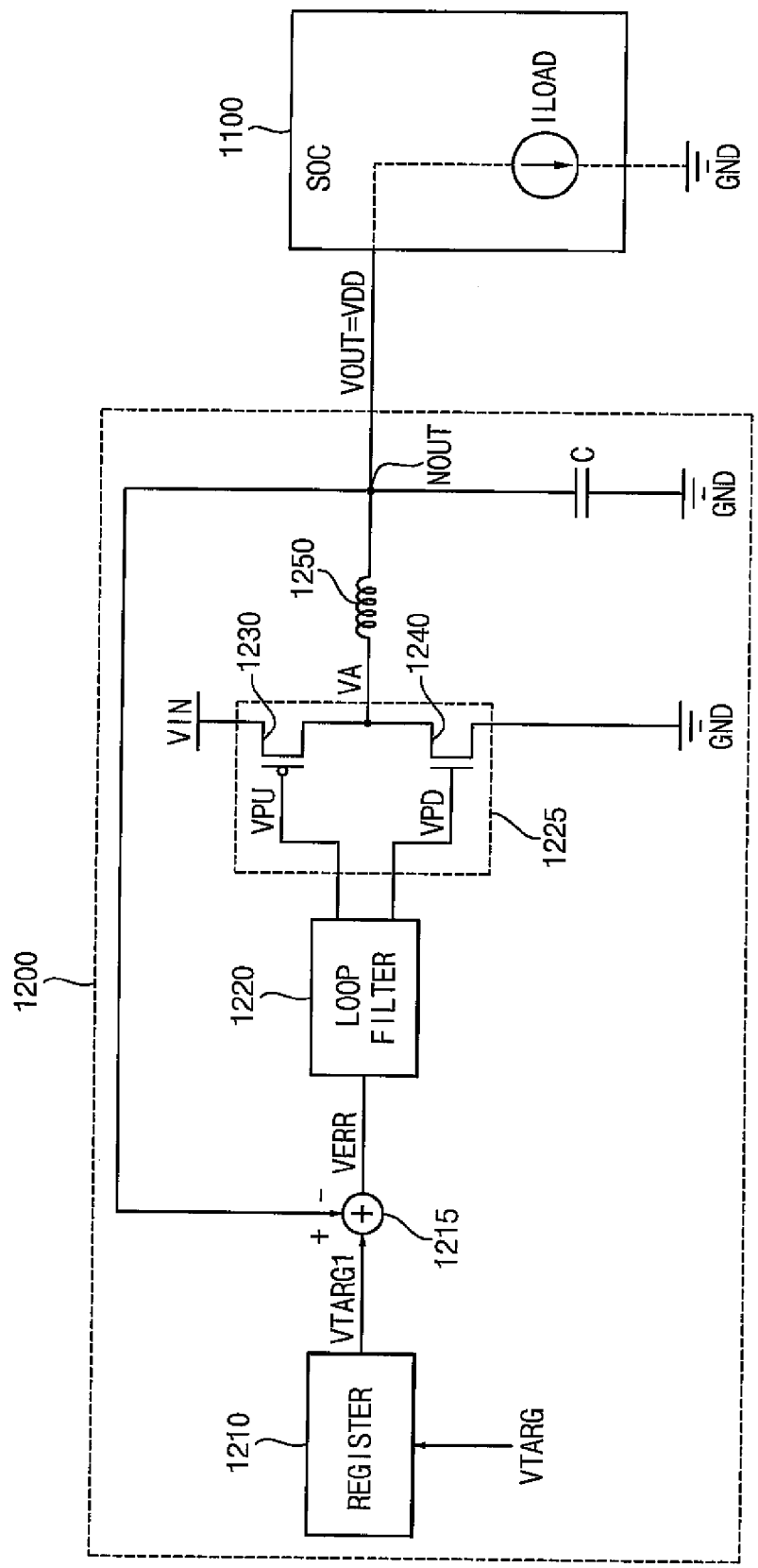
FIG. 9 is a circuit diagram illustrating a power control circuit in FIG. 6.

FIG. 9 is a circuit diagram illustrating power control circuit 1200 which includes register 1210, adder 1215, loop filter 1220, driving circuit 1225, inductor 1250 and capacitor C. Power control circuit 1200 may be, for example, a buck converter configured to receive direct input voltage VIN and generate power voltage VDD that is changed in response to target voltage VTARG. Register 1210 stores target voltage VTARG and outputs first voltage VTARG1 which corresponds to target voltage VTARG. Adder 1215 receives power voltage VDD from output node NOUT and generates voltage VERR which is the difference between first voltage VTARG1 and power voltage VDD. Loop filter 1220 eliminates high-frequency elements present in difference voltage VERR and generates a pull-up signal VPU and a pull-down signal VPD. Driving circuit 1225 generates a second voltage VA that is changed in response to pull-up signal VPU and pull-down signal VPD. Driving circuit 1225 includes pull-up transistor 1230 and pull-down transistor 1240. Pull-up transistor 1230 may be, for example, a p-channel power metal oxide semiconductor (MOS) transistor. The gate terminal of pull-up transistor 1230 receives pull-up signal VPU and the source terminal receives direct input voltage VIN. Pull-down transistor 1240 may be, for example, an n-channel power MOS transistor. The gate terminal of pull-down transistor 1240 receives pull-down signal VPD, the source terminal receives ground voltage GND and the drain terminal is connected to the drain terminal of pull-up transistor 1230. Inductor 1250 is connected between driving circuit 1225 and output node NOUT. Capacitor C is connected between output node NOUT and ground voltage GND. The output voltage VOUT of power control circuit 1200 is the power voltage provided to the SoC and the load current ILOAD is the current of the SoC.

Figure 10:
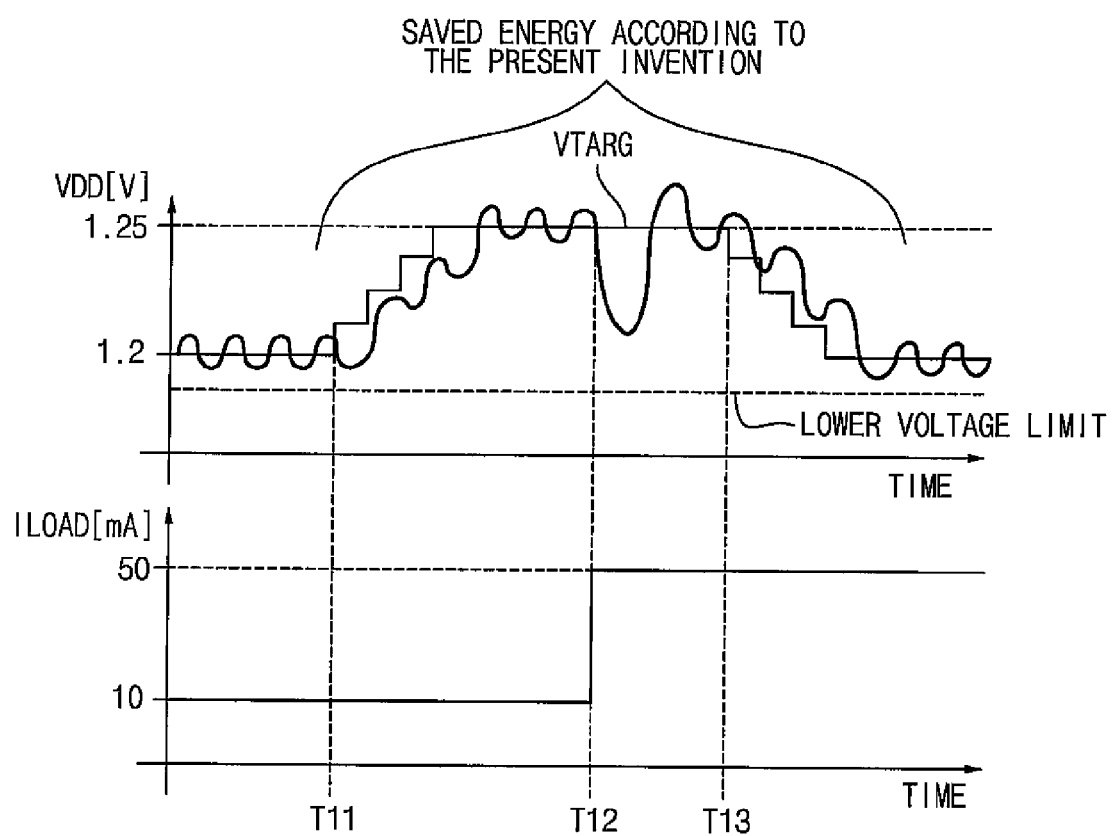
FIG. 10 is a graph illustrating waveforms of a power voltage according to changes of a load current and a target voltage in a system of dynamically scaling a power voltage according to an example embodiment of the present invention.

FIG. 10 is a graph illustrating waveforms of a power voltage according to changes of a load current and a target voltage in a system of dynamically scaling a power voltage. The operation of system 1000 of dynamically scaling a power voltage is described with reference to FIGS. 6 through 10. Referring first to FIG. 10, load current ILOAD transitions from about 10 mA to about 50 mA at time T12. Target voltage VTARG changes to about 1.2V and power voltage VDD changes to about 1.25V. Target voltage VTARG and power voltage VDD are greater than a lower voltage limit. Target voltage VTARG is about 1.2V before time T11 and target voltage VTARG starts to increase at time T11 step by step before time T12 when the load current transitions from about 10 mA to about 50 mA and target voltage VTARG reaches about 1.25V. Target voltage VTARG is about 1.25V before time T13 and target voltage VTARG starts to decrease at time T13 step by step before a time (not shown) when the load current transitions from about 50 mA to about 10 mA and target voltage VTARG reaches about 1.2V.

System 1000 which includes the SoC shown in FIG. 6 detects the activated application circuits of serial interface circuit 1130, communication circuit 1140 and multimedia circuit 1150 using the logic states of clock enable signals SER_EN, COM_EN and MUL_EN and estimates the magnitude of the currents consumed in each of the activated application circuits. System 1000 calculates the overshoot voltage and the undershoot voltage of power voltage VDD corresponding to the change of the first current, and generates target voltage VTARG which is changed based on the overshoot voltage and the undershoot voltage. Target voltage VTARG increases when the overshoot voltage or the undershoot voltage increases and the target voltage VTARG decreases when the overshoot voltage or the undershoot voltage decreases. Variation of target voltage VTARG is greater than the undershoot voltage of power voltage VDD when the first current transitions upward. The variation of target voltage VTARG is greater than the overshoot voltage of the power voltage VDD when the first current transits downward.

System 1000 which includes the SoC shown in FIG. 6 may efficiently decrease the overshoot voltage and the undershoot voltage of power voltage VDD and dynamically controlling power voltage VDD by changing target voltage VTARG before a transition of the load current of the SoC. In this manner, system 1000 dynamically scales a power voltage which decreases power consumed in the SoC.

Figure 11:
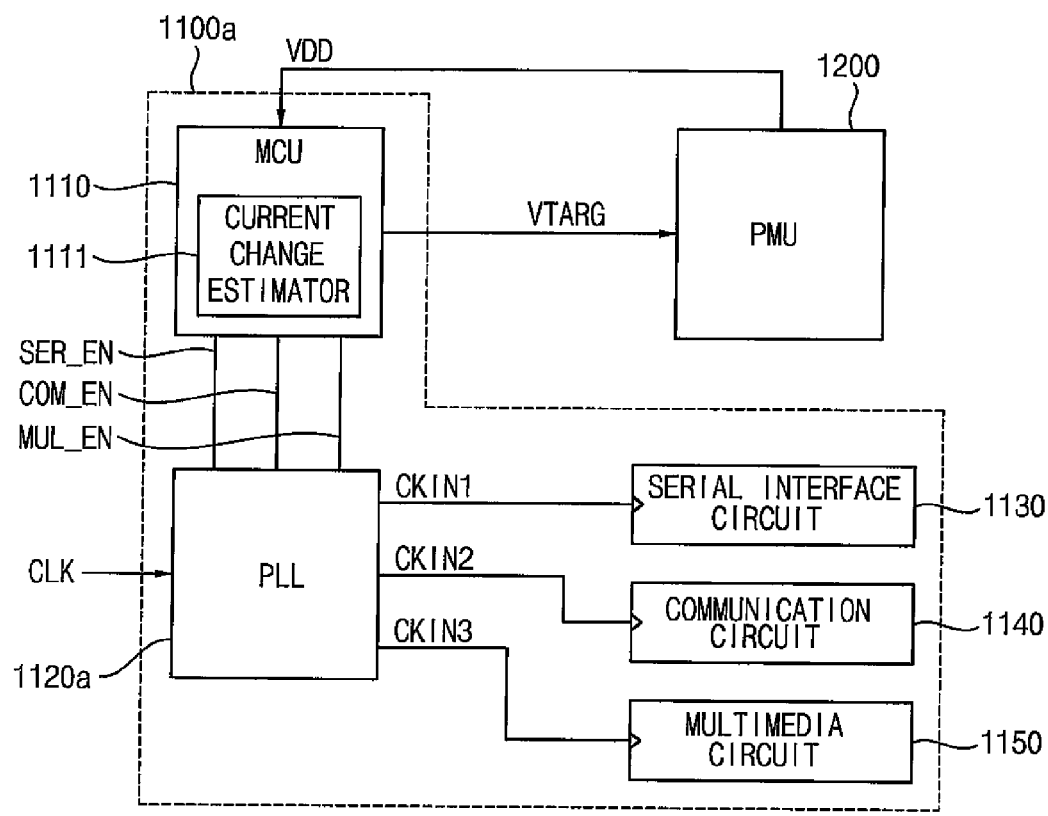
FIG. 11 is a block diagram illustrating a system of dynamically scaling a power voltage according to another example embodiment of the present invention.

FIG. 11 is a block diagram illustrating a system of dynamically scaling a power voltage utilizing system 2000 which includes SoC 1100a and power control circuit 1200. SoC 1100a includes application circuits 1130, 1140 and 1150. SoC 1100a generates internal clock signals CKIN1, CKIN2 and CKIN3 in response to external clock signal CLK. SoC 1100a estimates a change of the first current and generates target voltage VTARG based on the change of the first current. The first current is an operating current that is the sum or total current of application circuits 1130, 1140 and 1150. Internal clock signals CKIN1, CKIN2 and CKIN3 are respectively provided to each of the application circuits 1130, 1140 and 1150. These application circuits may be, for example, a serial interface circuit 1130, a communication circuit 1140 and a multimedia circuit 1150. Power control circuit 1200 generates power voltage VDD based on target voltage VTARG and supplies power voltage VDD to SoC 1100a.

SoC 1100a includes micro controller unit 1110, phase-locked loop (PLL) 1120a, serial interface circuit 1130, communication circuit 1140 and multimedia circuit 1150. Micro controller unit 1110 generates clock enable signals SER_EN, COM_EN and MUL_EN respectively used for serial interface circuit 1130, the communication circuit 1140 and the multimedia circuit 1150. Micro controller unit 1110 includes current change estimation unit 1111 configured to estimate the change of the first current and generates target voltage VTARG. The first current is the sum or total of current from serial interface circuit 1130, communication circuit 1140 and multimedia circuit 1150. Target voltage VTARG changes based on the change of the first current. PLL 1120a generates internal clock signals CKIN1, CKIN2 and CKIN3 in response to external clock signal CLK and clock enable signals SER_EN, COM_EN and MUL_EN.

System 2000 of FIG. 11 includes PLL 1120a which generates internal clock signals CKIN1, CKIN2 and CKIN3 in SoC 1100a differently from that generated in system 1000 illustrated with reference to FIG. 6. In system 2000, internal clock signals CKIN1, CKIN2 and CKIN3 enable serial interface circuit 1130, communication circuit 1140 and multimedia circuit 1150 respectively generated by PLL 1120a. Other than PLL 1120a, configurations of system 2000 are equivalent to those described with reference to FIG. 6.

As described above, a system for dynamically scaling a power voltage including an SoC may efficiently reduce an overshoot voltage and an undershoot voltage associated with a power voltage. The power voltage may be dynamically controlled by changing a target voltage before a transition of a load current of the SoC. In this manner, the power voltage may decrease power consumed in the SoC by decreasing the required voltage margin of the overshoot voltage and the undershoot voltage thereby accommodating use in mobile electronic devices.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A system comprising:
    a System-on-Chip (SoC) comprising a microcontroller operating in response to a power supply voltage and generating a target voltage, and a plurality of application circuits commonly integrated with the microcontroller on a semiconductor chip, the plurality of application circuits being physically separate from the microcontroller as integrated on the semiconductor chip and being selectively activated by the microcontroller; and
    a power control circuit configured to generate the power supply voltage in response to the target voltage,
    wherein the target voltage varies according to a number of the plurality of application activated at a same time by the microcontroller,
    wherein the microcontroller varies the target voltage according to a load current estimate for the semiconductor chip relative to different combinations of activated ones of the plurality of application circuits,
    wherein the microcontroller varies the target voltage according to a load current estimate for the semiconductor chip relative to different combinations of activated ones of the plurality of application circuits, and
    wherein the microcontroller is configured to retrieve a load current estimate from the lookup table, and generate the target voltage in response to the retrieved load current estimate.

2. The system of claim 1, wherein the SoC further comprises an internal clock generation unit that generates a plurality of internal clock signals, each one of the plurality of application circuits is selectively activated by a corresponding one of the plurality of internal clock signals.

3. The system of claim 2, wherein the internal clock generation unit generates in response to one or more clock enable signals received from the microcontroller, a first internal clock signal, a second internal clock signal, and a third internal clock signal, and
    the plurality of application circuits comprises a serial interface circuit activated by the first internal clock signal, a communication circuit activated by the second internal clock signal, and a multimedia circuit activated by the third internal clock signal.

4. The system of claim 1, wherein the power control circuit comprises a register that stores a value corresponding to the target voltage.

5. The system of claim 1, wherein the plurality of application circuits comprises a serial interface circuit, a communication circuit and a multimedia circuit.

6. A power management method for a System-on-Chip (SoC) operating in response to a variable power supply voltage, the SoC comprising a microcontroller and a plurality of application circuits, the method comprising:
    using a power control circuit external to the SoC, generating the variable power supply voltage and providing the variable power supply voltage to the SoC;
    using the microcontroller, generating-a target voltage and providing the target voltage to the power control circuit;
    changing the target voltage in accordance with a change in a number of the plurality of application circuits activated by the microcontroller,
    wherein the plurality of application circuits are commonly integrated with the microcontroller on a semiconductor chip, physically separate from the microcontroller as integrated on the semiconductor chip, and selectively activated by the microcontroller during operation of the SoC,
    wherein the SoC further comprises an internal clock generation unit, and the method further comprises: using the microcontroller, generating one or more clock enable signals; and using the internal clock generation unit, generating a plurality of internal clock signals in response to the one or more clock enable signals,
    wherein the method further comprises:
    selectively and respectively activating each one of the plurality of application circuits using a corresponding one of the plurality of internal clock signal;
    using the microcontroller, estimating a load current for the SoC in accordance with the number of the plurality of application circuits activated at the same time by the microcontroller, and then using the estimated load current to change the target voltage;
    storing different load current estimates in a lookup table in the microcontroller;
    estimating the load current for the SoC with reference to the lookup table; and
    retrieving one of the different load current estimates from the lookup table, and generating the target voltage from the retrieved load current estimate.

7. The method of claim 6, further comprising storing a value-indicative of the target voltage in a register of the power control circuit, and generating the power supply voltage according to the stored value.

8. A power management method for a System-on-Chip (SoC) operating in response to a variable power supply voltage, the SoC comprising a microcontroller and a plurality of application circuit, the method comprising:

using a power control circuit external to the SoC, generating the variable power supply voltage and providing the variable power supply voltage to the SoC;

using the microcontroller, generating a target voltage and providing the target voltage to the power control circuit;

using the microcontroller, activating a first number of the plurality of application circuits during a first time period, and supplying a first target voltage corresponding to the first number of the plurality of application circuits to the power control circuit;

using the power control circuit, generating the power supply voltage at a first level during the first time period in response to the first target voltage;

using the microcontroller, activating a second number of the plurality of application circuits during a second time period following the first time period and supplying the a second target voltage corresponding to the second number of the plurality of application circuits to the power control circuit, the second number being different than the first number, and the second target voltage being different than the first target voltage; and using the power control circuit, generating the power supply voltage at a second level during the second time in response to the second target voltage, wherein the plurality of application circuits are commonly integrated with the microcontroller on a semiconductor chip, physically separate from the microcontroller as integrated on the semiconductor chip, and selectively activated by the microcontroller during operation of the SoC, and wherein the method further comprises storing estimates of a load current for the SoC relative to the first and second numbers, the estimates of the load current being stored as a lookup table.

9. The method of claim 8, wherein each one of the plurality of application circuits is selectively activated in response to enablement of a respective one of a plurality of internal clock signals internally generated within the SoC under the control of the microcontroller.

10. The method as claimed in claim 8, further comprising retrieving a first load current estimate from the lookup table, and generating the first target voltage from the retrieved first load current estimate, and retrieving a second load current estimate from the lookup table, and generating the second target voltage from the retrieved second load current estimate.

11. The method of claim 8, further comprising applying the first target voltage to a register of the power control circuit, and generating the power supply voltage at the first level corresponding to the first target voltage, and applying the second target voltage to the register of the power control circuit, and generating the power supply voltage at the second level corresponding to the second target voltage.

* * * * *